(12) United States Patent
Shih et al.

(10) Patent No.: US 6,341,758 B1
(45) Date of Patent: Jan. 29, 2002

(54) GAS CONTROL MODULE SWITCH MECHANISM

(75) Inventors: Wun-Chang Shih; Dong-Cheh Ju; Yun-Chuan Tu; Yung-Tien Peng, all of Hsinchu (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 09/684,099

(22) Filed: Oct. 6, 2000

(30) Foreign Application Priority Data

Jul. 27, 2000 (TW) ........................ 89212952 U

(51) Int. Cl.⁷ ........................ F16K 31/122; F16K 31/02
(52) U.S. Cl. .................... 251/63.4; 251/129.01; 251/63.5; 251/331; 251/335.2
(58) Field of Search ............... 251/331, 335.2, 251/63.4, 129.01

(56) References Cited

U.S. PATENT DOCUMENTS

| | | | |
|---|---|---|---|
| 1,783,281 A | * 12/1930 | Cox | 251/331 X |
| 2,605,991 A | * 8/1952 | Kaye | 251/331 |
| 2,654,559 A | * 10/1953 | Franck | 251/335.2 X |
| 5,186,434 A | * 2/1993 | Nishimura et al. | 251/331 |
| 5,295,662 A | * 3/1994 | Yamaji et al. | 251/331 |
| 5,335,691 A | * 8/1994 | Kolenc | 251/331 X |

* cited by examiner

Primary Examiner—Kevin Shaver
Assistant Examiner—John Bastianelli

(57) ABSTRACT

A novel gas control module switch mechanism includes a diaphragm means, a valve body, a piston means and a fastening means. The diaphragm means has a plurality of diaphragms and a seal plate sandwiched between a first and a second diaphragm. The first diaphragm has a center opening to prevent the first diaphragm from making direct sealing contact. Sealing is done through the seal plate. The seal plate is made of a soft material for obtaining improved sealing effect and longer durability. The valve body has a bulged ring around an opening plane and a bulged body ring for enhancing sealing effect when the seal plate making contact with the bulged ring.

20 Claims, 4 Drawing Sheets

GAS CONTROL MODULE SWITCH MECHANISM

BACKGROUND OF THE INVENTION

1. Field of the Invention

The present invention relates to a gas control module switch mechanism and particularly a switch mechanism for accurately controlling open and stop of gas flow in a piping system.

2. Description of the Prior Art

Conventional techniques for gas control module switch mechanism generally use metallic diaphragm for sealing gas. However metallic material usually has relative hard property and is difficult to get precise sealing effect desired and may result in gas leaking. In semiconductor industry, a great number of control valves have to be deployed for precisely control gas flow. The gas is usually highly toxic. It is essential and critical to prevent gas leakage. On the other hand, metallic material is easy to wear off and has relatively short useful life span, and often results in increased frequency of repairs and maintenance, and higher maintenance cost.

FIG. 1 shows a conventional technique. There is a valve body A5 which has a gas inlet A3 and a gas outlet A4. The gas inlet A3 is engaged with and surrounded by a replaceable valve seat A1 which includes a round sealing barrel A11 and a seal member A13. The sealing barrel A11 and seal member A13 are both machining parts. After using for a period of time, the seal member A13 and a metal seal A2 will be worn off because of constant friction between each other and need replacement. For replacing the valve seat A1 and metal seal A2, the valve body A5, cylinder A6 and brake linkage bar A7 should be disassembled. It is very time consuming and further increases maintenance cost. As a result, this technique has the disadvantages of poorer sealing effect, increased cost in consumption materials and maintenance, and more production time loss.

The main problem of the conventional structure mentioned above results from complicated design. If the disassembly of the structure were limited to only the valve body A5, or cylinder A6 and brake linkage bar A7, replacement of parts related to sealing may all be done at one time. Maintenance cost may be greatly reduced. The whole structure will also be simplified and may result in lower production and machining costs.

SUMMARY OF THE INVENTION

The present invention aims at using relative soft material and improved structure to resolve the problems incurred to conventional techniques for achieving the following objects:

1. to increase useful life of consumption materials and reduce maintenance frequency,
2. to simplify design and lower production cost,
3. to make machining easier and reduce machining defects,
4. to make assembly work simpler and make maintenance faster at a lower cost.

BRIEF DESCRIPTION OF THE DRAWINGS

The invention, as well as its many advantages, may be further understood by the following detailed description and drawings. The accompanying drawings are only to serve for reference and illustrative purpose, and do not intend to limit the scope of the present invention.

DETAILED DESCRIPTION OF THE PREFERRED EMBODIMENT

In a preferred embodiment of the present invention depicted below, the diaphragm means and valve seat will be explained in details. The cylinder means and fastening means are mostly like the conventional ones and form no part of the present invention, thus will be described briefly and only be focused on their relationship with the present invention.

Figure 1:
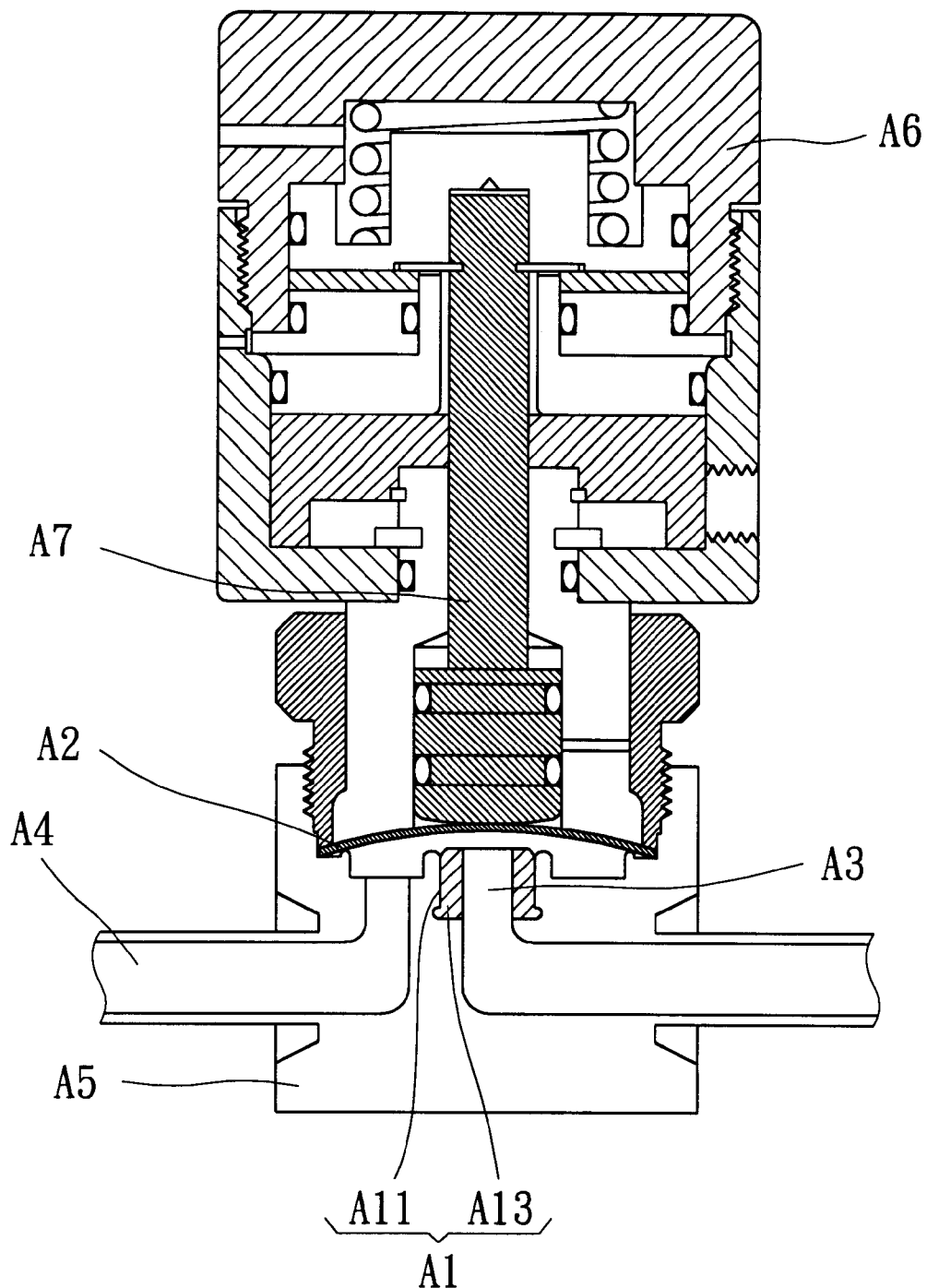
FIG. 1 is a sectional view of a conventional technique.
Figure 2:
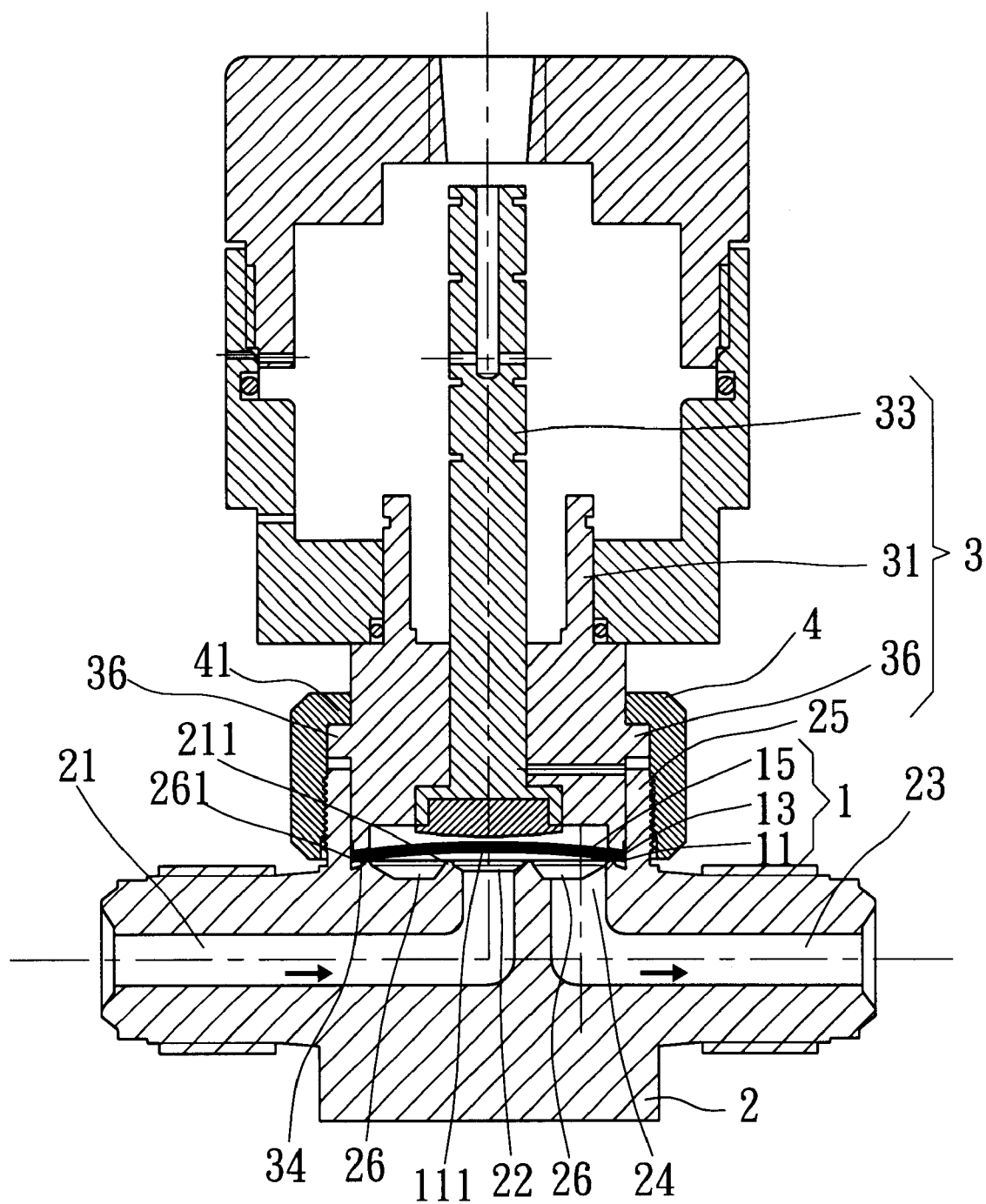
FIG.2 is a sectional view of an embodiment according to the present invention, using air cylinder.

FIG. 2 shows a preferred embodiment of a gas control module switch mechanism according the present invention that uses air cylinder to perform open and close control. The mechanism includes a piston means 3 (including a piston valve 31, a link element 33, a piston valve bottom end 34 and a piston valve flange 36), a fastening means 4 (including a shoulder 41, being a fastening screw nut in this embodiment), a diaphragm means 1 (including a first diaphragm 11, a seal plate 13 and a second diaphragm 15) and a valve body 2.

In this embodiment, the piston valve 31 is an air cylinder, the link element 33 is a brake linkage bar, and the piston valve bottom end 34 is a clamp. The piston valve 31 may be electromagnetic or manual driven for actuating the link element 33 to perform switching action.

The fastening means 4 is a fastening screw nut mating with a hollow fastening screw head 25 of the valve body 2 for engaging the piston means 3, diaphragm means 1 and valve body 2 together. The fastening means 4 has a lower end which has internal screw threads for engaging with the external screw threads formed on the hollow fastening screw head 25, then the shoulder 41 may tightly press the piston valve flange 36 to hold the diaphragm means 1 in the valve body 2.

The first diaphragm 11 has a center hole 111. The diaphragm means 1 has a plurality of diaphragms (the first diaphragm 11 and second diaphragm 15) which are made of metallic material. The thickness of the metallic material may range from 0.1 mm to 0.3 mm, preferably 0.15 mm. The seal plate 13 is made of Teflon with thickness ranges from 0.2 to 0.8 mm, preferably 0.5 mm, and is located between the first diaphragm 11 and second diaphragm 15. The diaphragms and seal plate 13 have same diameter. The diaphragm means 1 is pressed by the piston valve bottom end 34 at the outer rim to fixedly located in the valve body 2.

The valve body 2 includes a gas inlet pipe 21, a gas inlet opening 22 (having a bulged annular ring 211), a gas outlet pipe 23, a gas outlet opening 24, a hollow fastening screw head 25 which has a trough 26 formed therein, and a circular bulged body ring 261. The gas inlet opening 22 and gas outlet opening 24 communicate respectively with the gas inlet pipe 21 and gas outlet pipe 23. The diaphragm means 1 is located at an upper end of the annular ring 211 and body ring 261, and is held firmly between the body ring 261 and piston valve bottom end 34. The gas outlet opening 24 is formed in the trough 26 and communicates with the gas outlet pipe 23. The upper end surfaces of the annular ring 211 and body ring 261 are respectively located at same or slightly different horizontal level for the diaphragm means 1 to have a better sealing effect.

Figure 3:
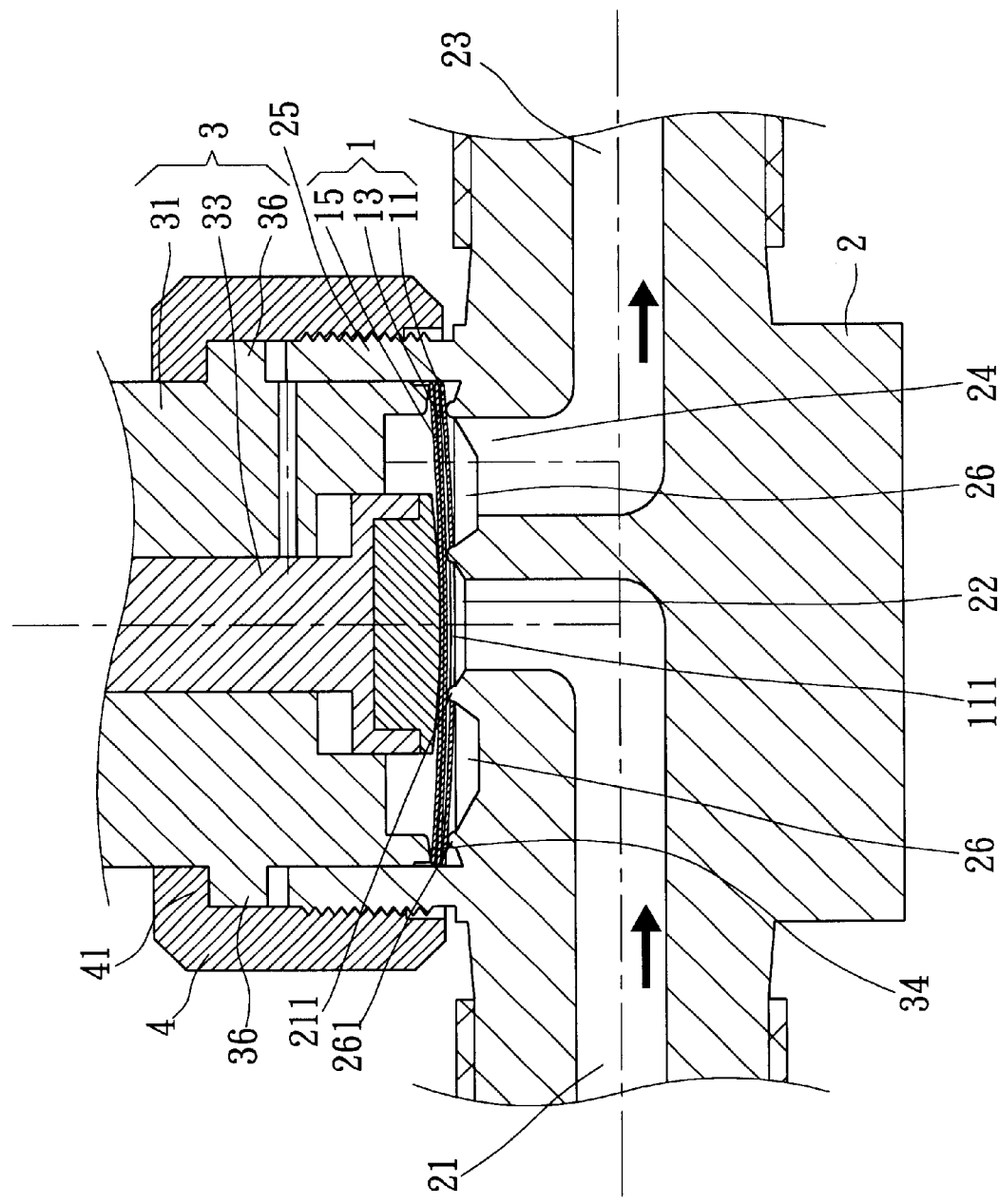
FIG. 3 is fragmentary sectional view of the present invention, showing a link element at the first position.

Referring to FIG. 3, the link element 33 has one end facing the diaphragm means 1 and is movable by the piston valve 31 to press against the diaphragm means 1 to become a first position. At the first position, the link element 33 presses the diaphragm means 1 downward and make the seal plate 13 pressing against the annular ring 211 and body ring 261 to seal the gas inlet opening 22. As the center hole 111 has a greater diameter than the annular flange 211, the first diaphragm 11 does not make contact with the annular flange 211. The seal plate 13 may directly press against the annular ring 211 to form a tightly seal for the gas inlet opening 22. The seal plate 13 may be made of relatively soft material (such as Teflon) so that sealing function set forth above may be performed without the metallic contact that might otherwise happen to the conventional technique. Metal wearing thus may be avoided. Leakage problem may be prevented or greatly reduced. It also resolves conventional high maintenance cost problem.

Figure 4:
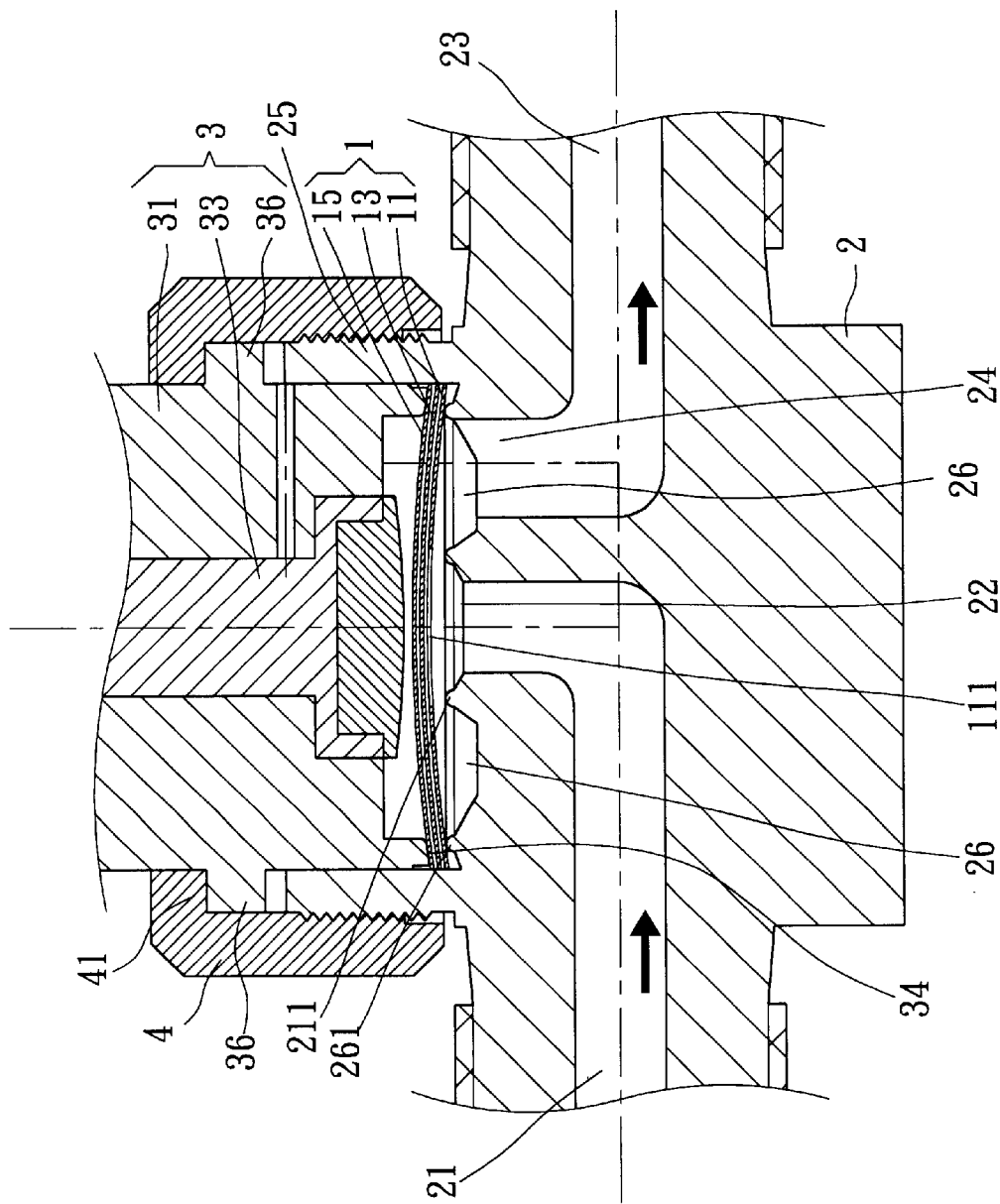
FIG. 4 is fragmentary sectional view of the present invention, showing a link element at the second position.

FIG. 4 shows the situation when the link element 33 being moved to a second position. This is also the initial installation position in which the diaphragm means 1 is located under the link element 33 and forms a concave bottom side. At this position, the link element 33 does not press against the diaphragm means 1. The seal plate 13 is moved away from the bulged annular ring 211 of the gas inlet opening 22 without any sealing effect. The diaphragm means 1 forms a convex curve upward at the middle portion to enable a communication passage formed between the gas inlet opening 22 and gas outlet opening 24. Hence fluid may flow from the gas inlet opening 22 to the trough 26 then flow out through the gas outlet opening 24 and gas outlet pipe 23.

When the link element 33 moves downward again at the first position to press the convex surface of the diaphragm means 1 (FIG. 3), the diaphragm means 1 will be moved downward and the seal plate 13 will make tightly contact with the annular ring 211 to seal the gas inlet opening 22. The communication passage between the gas inlet opening 22 and gas outlet opening 24 will be blocked to stop fluid flow.

In this embodiment, the first diaphragm 11 is used to provide restoring spring force for the diaphragm means 1 to move upward in a convex shape at the second position. The second position is set as a normal position. Sealing is not the purpose of the first diaphragm 11. The number of diaphragm is depended on the restoring force required, and may be increased or decreased based on consideration of sealing effect intended to achieve and cost saving concern.

By means of the present invention, using a number of diaphragms and a sealing plate may achieve sealing effect desired. The valve body 2 no longer needs a sealing barrel A11 and seal member A13 as conventional techniques do. Furthermore, the present invention offers a simpler structure which is easier to produce at a lower cost. Repairs and maintenance is also simpler and less expensive. Test results of finished products based on the present invention show that helium gas external leakage rate may reach $8\times10_{-11\ sccs}$, and internal leakage rate may reach $5.5\times10_{-10\ sccs}$. All meet national standards.

It is to be noted that using the air cylinder in aforesaid embodiment should not be considered as limitation of the present invention. Other types of fluid, such as liquid means, may also be used equally well. While the preferred embodiment of the present invention has been set forth for purpose of disclosure, it would be obvious to those skilled in the art that various other changes and modifications can be made without departing from the spirit and scope of this invention.

What is claimed is:

1. A gas control module switch mechanism, comprising:
   a diaphragm means including at least a first diaphragm, a second diaphragm and a seal plate located between the first and second diaphragm, the first diaphragm having a center opening,
   a valve body including a gas inlet pipe, a gas outlet pipe, a hollow fastening screw head which has a gas inlet opening and a gas outlet opening for communicating respectively with the gas inlet pipe and gas outlet pipe, the diaphragm means being located at the gas inlet opening,
   a piston means including a piston valve and a link element, the link element having one end facing the diaphragm means and being movable up or down to contact or separate from the diaphragm means through the piston valve, and
   a fastening means for fastening the piston means, diaphragm means and valve body together wherein the seal plate contacts a valve seat of the gas inlet opening.

2. The gas control module switch mechanism according to claim 1, wherein the gas inlet opening has a bulged annular ring formed around a top end thereof for engaging tightly with the seal plate.

3. The gas control module switch mechanism according to claim 2, wherein the diaphragm means forms a concave bottom side under the link element at an initial and normal position, the link element may be moved downward to a first position to press the diaphragm means downward for the seal plate to make close contact with a bulged annular ring around the gas inlet opening for sealing the gas inlet opening, and the link element may be moved upward to a second position to separate from the diaphragm means so that the diaphragm means will be restored to the normal position for the seal plate to move away from the bulged annular ring to enable fluid flowing out.

4. The gas control module switch mechanism according to claim 2, wherein the valve body has a bulged body ring formed therein for holding the diaphragm means between a piston valve bottom end and the bulged body ring.

5. The gas control module switch mechanism according to claim 4, wherein the bulged annular ring and bulged body ring are respectively located at a horizontal level, and have substantially same height or slightly different heights.

6. The gas control module switch mechanism according to claim 1, wherein the valve body has a trough formed therein.

7. The gas control module switch mechanism according to claim 1, wherein the center opening has a diameter larger than a bulged annular ring diameter.

8. The gas control module switch mechanism according to claim 1, wherein the diaphragm means forms a convex curve upward at a middle portion thereof.

9. The gas control module switch mechanism according to claim 1, wherein the diaphragms and the seal plate have equal diameters.

10. The gas control module switch mechanism according to claim 1, wherein the diaphragms means has a third or more diaphragm located above the second diaphragm for adding spring force desired.

11. The gas control module switch mechanism according to claim 1, wherein the seal plate is made of Teflon.

12. The gas control module switch mechanism according to claim 1, wherein the seal plate has a thickness of 0.2 mm to 0.8 mm.

13. The gas control module switch mechanism according to claim 1, wherein the diaphragms are made of metal material.

14. The gas control module switch mechanism according to claim 1, wherein each diaphragm has a thickness of 0.1 mm to 0.3 mm.

15. The gas control module switch mechanism according to claim 1, wherein the piston valve is an air cylinder type.

16. The gas control module switch mechanism according to claim 1, wherein the piston valve is an electromagnetic type.

17. The gas control module switch mechanism according to claim 1, wherein the link element is a brake linkage bar.

18. The gas control module switch mechanism according to claim 1, wherein the fastening means mates and engages tightly with the hollow fastening screw head.

19. The gas control module switch mechanism according to claim 1, wherein the fastening means is a fastening screw nut for engaging tightly with external screw threads formed on the hollow fastening screw head.

20. The gas control module switch mechanism according to claim 19, wherein the fastening screw nut has a shoulder to press against a piston valve flange for fastening the diaphragm means tightly.

* * * * *